April 21, 1959
E. HUMEL
2,882,601
MEASURING AND MARKING RULER
Filed May 2, 1957
2 Sheets-Sheet 1
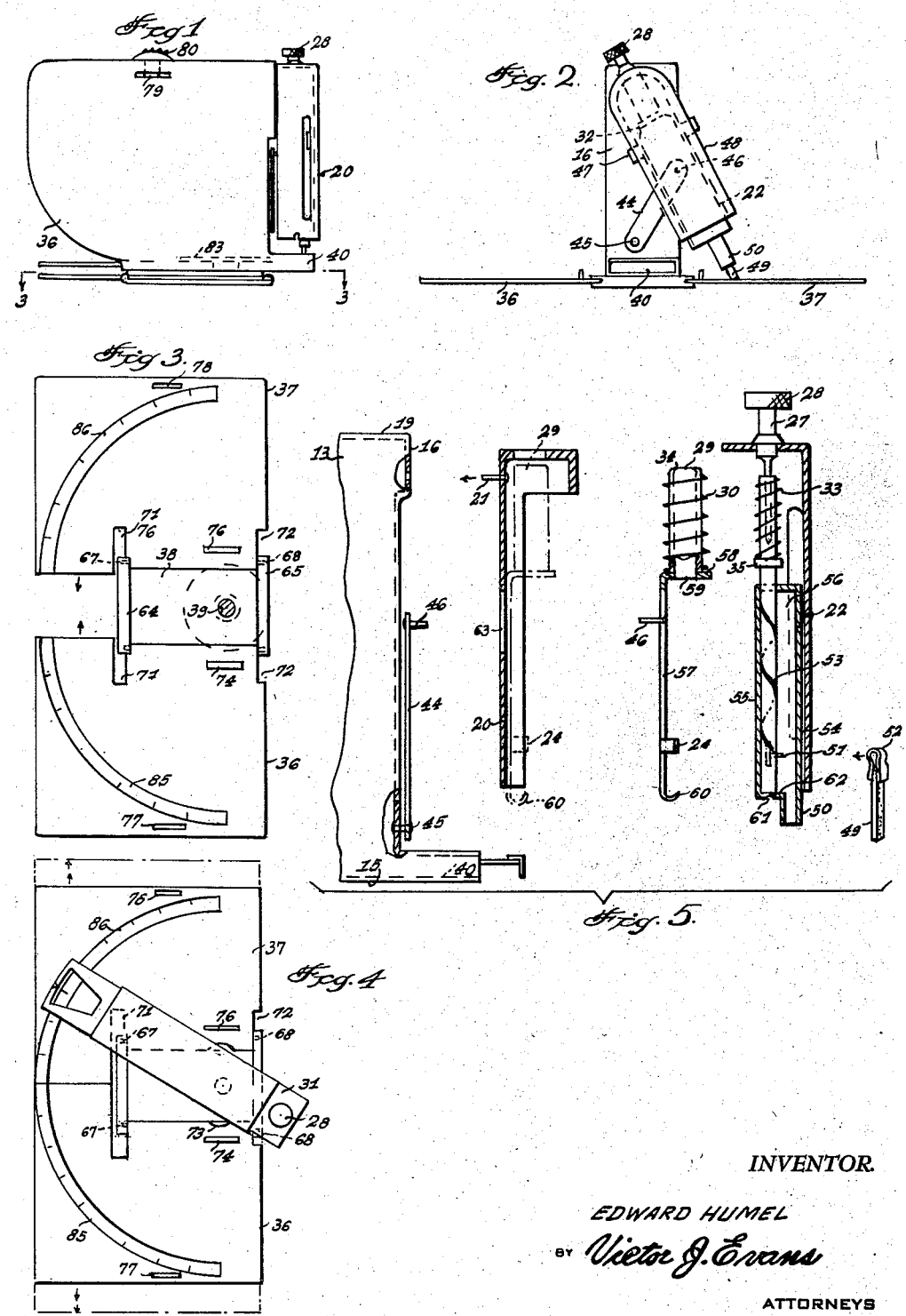
INVENTOR.
EDWARD HUMEL
BY *Victor J. Evans*
ATTORNEYS April 21, 1959 E. HUMEL 2,882,601
MEASURING AND MARKING RULER
Filed May 2, 1957 2 Sheets-Sheet 2
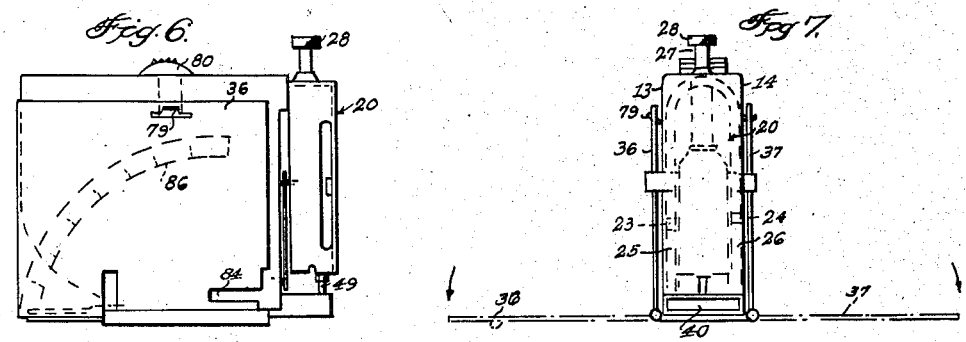
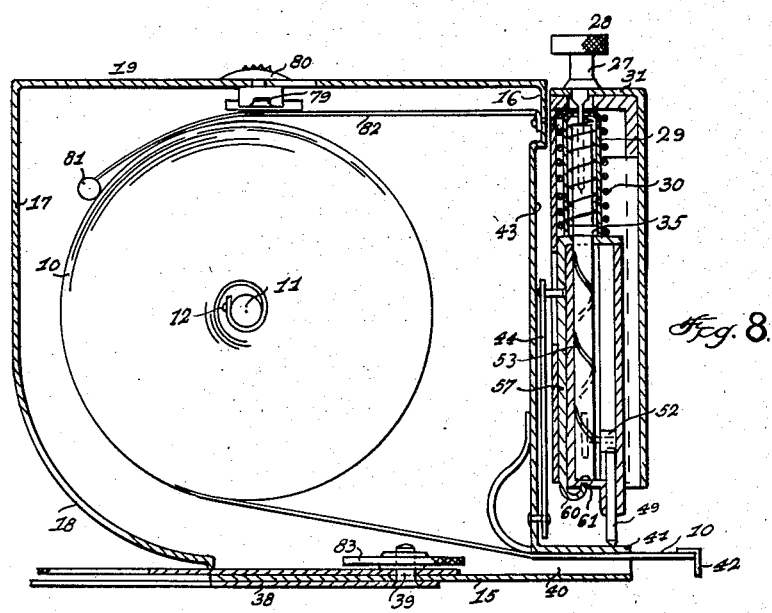
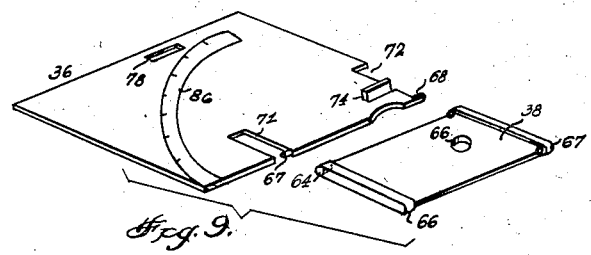
INVENTOR.
EDWARD HUMEL
BY Victor J. Evans & Co.
ATTORNEYS

United States Patent Office 2,882,601
Patented Apr. 21, 1959

2,882,601

MEASURING AND MARKING RULER

Edward Humel, Alexandria, Va.

Application May 2, 1957, Serial No. 656,602

3 Claims. (Cl. 33—26)

This invention relates to steel measuring tape casings or holding devices wherein steel tape is drawn from a slot in a casing, and in particular a scribe or marking implement installed, as an attachment on a steel tape casing whereby objects or materials may be measured and marked with a scribe and wherein, with the end of the tape positioned on a center the scribe may be moved around the center to mark a circle or part thereof as may be desired, and also wherein the casing may be set at different angles on a vernier to mark materials at different angles.

The purpose of this invention is to provide an attachment for a steel tape housing wherein the device may be used for scribing both circles and angles.

Various types of measuring and marking devices have been provided, however, such devices are limited because of the length of the rule or scale used therein and it is substantially impossible to lengthen the scale without enlarging the housing to such an extent that it is objectionable to use and carry. With this thought in mind this invention contemplates an attachment for a steel measuring tape casing wherein the tape may be drawn outwardly for measuring and whereby materials may be marked to a desired dimension with the tape extended.

The object of this invention is, therefore, to provide an attachment for a steel tape casing whereby the tape may be used in the conventional manner and also wherein marking means is provided on the extended end of the casing.

Another object of the invention is to provide a scribing attachment for a measuring tape casing wherein the scribing element is retractable when not in use and readily extended to either side of the tape when use thereof is desired.

A further object of the invention is to provide a steel measuring tape casing having scribing means in combination therewith in which the device is of a simple and economical construction.

With these and other objects and advantages in view the invention embodies a relatively thin casing, a steel measuring tape mounted on a spindle in the casing and positioned to extend from a slot in a lower corner thereof, a knurled button providing a brake for holding the roll of tape in a desired position, a scribing instrument carried by an arm pivotally mounted on the end of the casing in which the tape outlet opening is positioned, and a pair of side plates pivotally mounted on the lower end of the casing and adapted to be extended to facilitate turning the tape to a predetermined angle in relation to edges of the side plates.

Other features and advantages of the invention will appear from the following description taken in connection with the drawings, wherein:

Figure 1 is a side elevational view showing the improved measuring tape casing with the scribing attachment on one end thereof.

Figure 2 is an end elevational view of the measuring tape and marking tool showing the scribing instrument mounting on the end of the casing.

Figure 3 is a sectional plan taken on line 3—3 of Fig. 1 showing the vernier plate extended and with the steel measuring tape casing removed.

Figure 4 is a plan view similar to that shown in Fig. 3 showing the steel measuring tape and marking instrument positioned at an angle, such as 30°, in relation to a line positioned between and parallel to inner edges of the plates.

Figure 5 is an exploded view showing the parts of the scribing implement carrying attachment with the parts spaced from the end of the steel measuring and marking tape housing.

Figure 6 is a side elevational view similar to that shown in Fig. 1 showing the steel measuring and marking tape casing with the vernier carrying side plates positioned thereon.

Figure 7 is an end elevational view of the casing with the parts as shown in Fig. 6 showing the vernier side plates nested against the sides of the casing in full lines and in extended positions in broken lines.

Figure 8 is a longitudinal section through the steel measuring and marking tape housing showing the scribing attachment on the face or inner end thereof.

Figure 9 is an exploded view showing one of the vernier carrying side plates with a mounting plate by which the side plates are secured in position upon the steel measuring and marking tape casing.

Referring now to the drawings wherein like reference characters denote corresponding parts the improved measuring and marking tape instrument of this invention includes a steel tape 10 positioned in a coil or roll mounted on a spindle 11 with the end of the tape secured to the spindle with a fastener 12, side plates 13 and 14 in which ends of the spindle 11 are mounted, a base plate 15 from the edges of which the side plates 13 and 14 extend, a front plate 16 connecting edges of the side plates, a rear plate 17 having an arcuate section 18 in the lower portion, a cover 19 connecting edges of the side plates or walls to the front and rear plates or walls, a U-shaped arm 20 pivotally mounted on the front plate 16 with a pin 21, a scribe holder 22 having wings 23 and 24 at the sides which are slidably positioned on outer edges of flanges 25 and 26 of the arm 20, a pin 27 having a knurled edge 28 on the upper end extended upwardly from the holder 22 and positioned in a tube 29, a spring 30 extended around the tube 29 and positioned between the upper end 31 of the arm 20 and the upper end 32 of the holder 22, a spring 33 in the tube 29 and positioned around the pin 27 between the upper end of the tube 29, which is crimped inwardly as shown at the point 34 and a set collar 35 secured on the lower part of the pin, as shown in Fig. 5, and side plates 36 and 37 positioned on opposite sides of the casing and pivotally connected to a plate 38 which is connected to the base plate 15 of the measuring tape casing with a bolt 39.

The measuring tape 10 extends through a slot or throat 40 in the lower inner corner of the casing and the throat is provided with a guide 41. The measuring tape 10 has an angle bar 42 suspended on the otuer end outwardly of the guide 41 for the throat 40.

The front wall or plate 16 of the casing is provided with an indentation or recess 43 and a link 44, which is positioned in the recess is pivotally connected by a pin 45 to the lower part of the front wall 16 and the upper end thereof is pivotally connected by a pin 46 to the arm 20 which is pivotally mounted by a pin 21 on the upper portion of the front wall 16. The arm 20 is provided with side flanges 47 and 48.

The scribe, such as a crayon, pencil lead, or point 49 extends through a neck 50 depending from the lower end of the holder 22 and a pin 51 on a hub 52 at the upper end of the scribe 49 extends into a spiral groove 53 in the lower part of the pin 27 whereby by turning the head 28 of the pin between the thumb and forefinger of a hand the scribe 49 is retracted or withdrawn as may be desired. The holder 22 is provided with a front wall 54, a rear wall 55 and side walls 56.

The holder 22 is provided with a guide 57 having a flange 58 with an opening 59 therein on the upper end and with the guide positioned against the inner surface of the holder 22 the pin 27 extends through the opening 59 of the flange of the guide. The wings 23 and 24 extend from the lower portion of the guide and the lower end of the guide is provided with a projection 60 by which the guide is retained in a recess 61 in a lower section 62 of the holder 22. The upper part of the guide is secured to the pin 46 that extends from the upper end of the link 44. The rear wall of the arm 20 is provided with a slot 63 through which the pin 46 extends.

The bottom plate 38, which is secured to the base plate 15 by the bolt 39 is formed with sockets 64 and 65 which extend across the ends, and which are channel shaped in cross section whereby, with the plate secured to the lower surface of the base 15 by a bolt 39 extended through an opening 66 the side plates 36 and 37 may be pivotally mounted on the measuring and marking tape casing, pins 67 and 68 of the plate 36 being positioned in the sockets 64 and 65. Similar pins 69 and 70 are provided on the plate 37. In this movement the pins 69 and 70 slide in the elongated sockets 65 and 64 and the sockets slide in recesses 71 and 72 in the edges of the side plates. The side plate is also provided with an arcuate notch 73 to provide clearance for the bolt 39 and a stop 74 limits inward travel thereof. The plate 37 is provided with a similar arcuate recess 75 and also with a similar slot 76.

The extended edges of the plates 36 and 37 are provided with openings 77 and 78 through which latching elements 79, actuated by a button 80 extend for securing the side plates nested against outer surfaces of the casing. The button 80 also actuates a brake 81 carried by a spring arm 82.

The bolt 39, securing the plate 38 to the base 15 of the casing is provided with an enlarged nut or disc 83 having a knurled peripheral edge which extends through slots 84 in the sides of the casing.

The side plates 36 and 37 are also provided with sections 85 and 86 of a protractor scale, the sections being described about the center of the bolt 39 and providing means for setting the casing at an angle, as illustrated in Fig. 4.

With the parts assembled as illustrated and described a scribe, such as a pencil lead, crayon, or point, slidably mounted in the holder 22 is nested against the end of the casing, as shown in Fig. 7, when not in use and when it is desired to mark a dimension at one side of the casing the holder is extended, as shown in Fig. 2 whereby the scribe 49 may mark a dimension or scribe a circle or angle, as may be desired.

In scribing a circle, arc, or segment the tape is withdrawn and the zero placed upon a center whereby with the scribe positioned a distance equal to a radius of a circle from the zero mark the device is carried around the center marking a circle, or part thereof, as may be desired.

In scribing an angle the side plates 36 and 37 are extended, as shown in Figs. 3 and 4 and the casing turned to the desired angle, as indicated on the protractor scale and with the tape extended a line may be scribed from the edges of the side plates with the line accurately indicating the desired angle.

In use the pins 67, 68, 69 and 70 slide in the sockets 64 and 65 with the edges of the plates in meeting relation, as shown in Fig. 4, and for storage the pins slide to the ends of the sockets, as shown in Fig. 3.

With the scribing point mounted in the holder 22 the scriber is free to slide vertically independently and also in combination with the arm 20. The scriber is also mounted to be actuated with a radial movement, and furthermore, the scriber travels in a plane parallel to the work, or sheet of material being marked.

The scribe holder 22 is in two open compartments with the spiral tube 53 in the lower compartment and the T-pin 51 partly in the lower compartment and partly in the upper compartment. The two compartments are separated by an open partition that separates the compartments and acts as a guide for the pin 61. With this assembly it is possible to use either a round, flat, or square lead, as the pencil adapter is of spring steel construction, which compensates for the different scribing instruments.

The universal adapter provides a holder for different types of pencils and scribes, and the radial movement of the arm permits the pivoted scribe holder to move both independently and in combination with the holder to guide the scriber point parallel to the object being marked.

It will be understood that modifications, within the scope of the appended claims, may be made in the design and arrangement of the parts without departing from the spirit of the invention.

What is claimed is:

1. In a measuring and marking tape assembly, the combination which comprises a roll of steel measuring tape, a casing in which the roll of tape is rotatably mounted, said casing having a throat through which the tape extends, a vertically disposed arm pivotally mounted, at the upper end, on the casing, a scribe holder slidably mounted in the arm, a scribing implement carried by the holder, a link pivotally connected to the scribe holder and to the casing, means adjusting the position of the scribe in the arm and holder, and side plates having protractor scales thereon on which the casing is pivotally mounted, for adjusting the angle of the casing.

2. In a measuring and marking tape assembly, the combination which comprises a roll of steel measuring tape, a casing in which the roll of tape is rotatably mounted, said casing having a throat through which the tape extends, a vertically disposed arm pivotally mounted, at the upper end, on the casing, a scribe holder slidably mounted in the arm, a scribing implement carried by the holder, a link pivotally connected to the scribe holder arm and holder, a link pivotally connected to the scribe holder and to the casing, side plates having protractor scales thereon on which the casing is pivotally mounted for adjusting the angle of the casing, and latching means for retaining the side plates nested against sides of the casing.

3. In a measuring and marking tape assembly, the combination which comprises a roll of steel measuring tape, a casing in which the roll of tape is rotatably mounted, said casing having a throat through which the tape extends, a vertically disposed arm pivotally mounted, at the upper end, on the casing, a scribe holder slidably mounted in the arm, a scribing implement carried by the holder, a link pivotally connected to the scribe holder and to the casing and means adjusting the position of the scribing implement in the arm and holder, the pivotal and slidable mounting of the arm and scribe holder permitting movement of the scribing implement transverse to the tape and also permitting the scribing implement to move independently and in combination with the scribe holder whereby the scribing implement may be moved in a plane perpendicular to an object being marked.

References Cited in the file of this patent

UNITED STATES PATENTS

| | | |
|---|---|---|
| 1,613,676 | Raphael | Jan. 11, 1927 |
| 2,065,143 | Metcalf | Dec. 22, 1936 |
| 2,807,886 | Aciego | Oct. 1, 1957 |